O. F. MAYHEW.
Fruit Dryer.

No. 94,967.             Patented Sept. 21, 1869.

Witnesses:            Inventor:

United States Patent Office.

OSCAR F. MAYHEW, OF INDIANAPOLIS, INDIANA.

Letters Patent No. 94,967, dated September 21, 1869.

DRIER.

The Schedule referred to in these Letters Patent and making part of the same.

*To all whom it may concern:*

Be it known that I, OSCAR F. MAYHEW, of Indianapolis, in the county of Marion, and State of Indiana, have invented new and useful Improvements in Room, Water, and Iron-Heaters, and Clothes and Fruit-Driers; and I do hereby declare that the following is a full, clear, and exact description thereof, that will enable skilled artisans to make and use the same, reference being had to the accompanying drawing, and to the letters of reference marked thereon, making part of this specification.

This invention relates to construction of a portable drying-case or chamber, and to the arrangement of a heating-apparatus therein, the whole being designed and adapted to the purposes of heating rooms, water, and sad-irons, and to drying fruit, clothes, and other similar articles, with a view to efficiency of operation, economy of fuel, and compactness and cheapness of construction.

Similar letters of reference indicate corresponding parts in the several figures.

Figure 1:
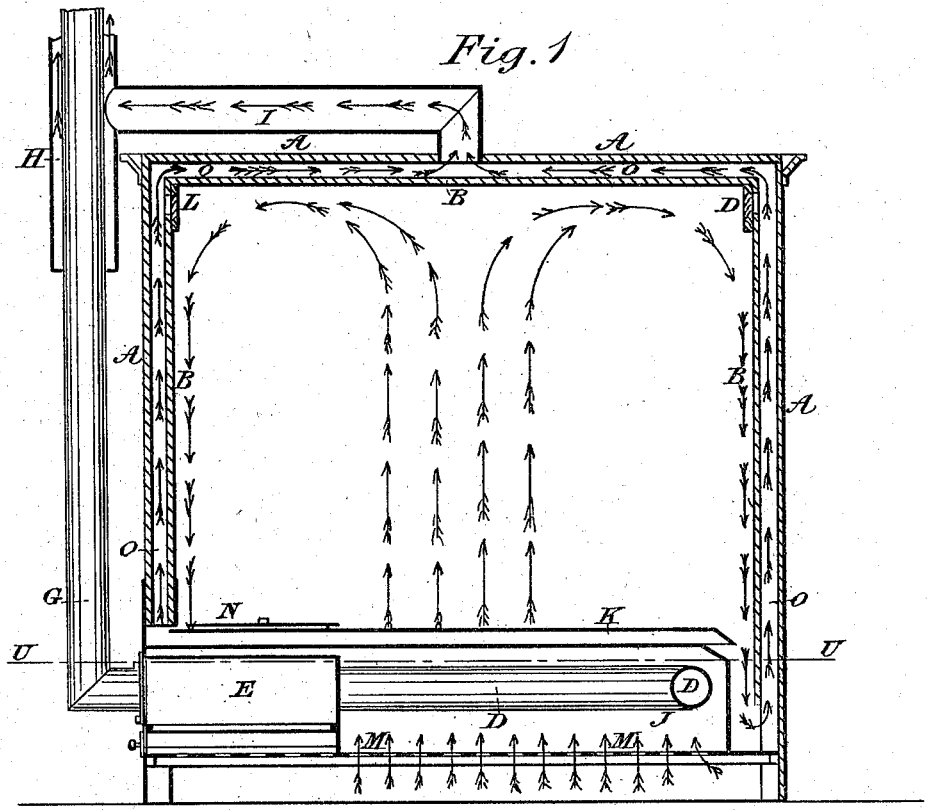
Figure 1 is vertical longitudinal section on line $x\,y$, fig. 2.
Figure 2:
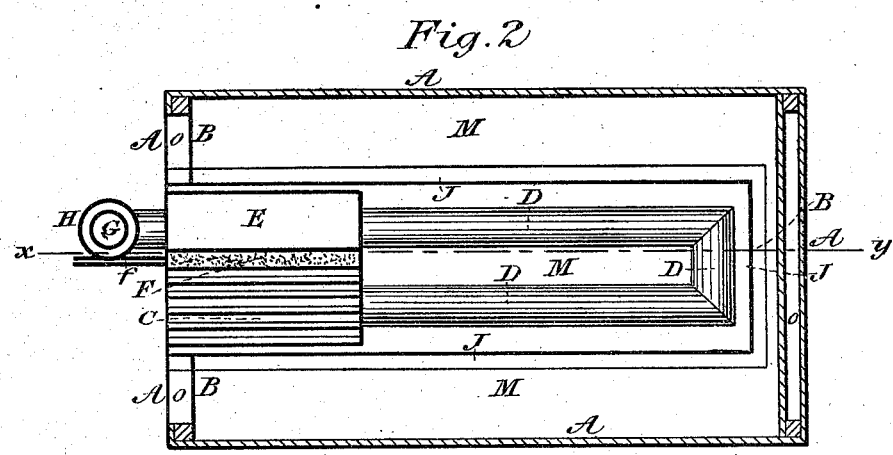
Figure 2 is a horizontal section on line $u\,v$, fig. 1.

A is the external case, the ends and top of which are made double, forming an air-space by the line B, on the inside, as shown.

Access is had to the case by doors hung in the front side. These doors are not shown in the drawing.

The floor of the drier is made of sheet-metal, and on this the heating-apparatus, consisting of the fire-chamber C, pipe or flue D, return-chamber E, and water-back or chamber F, is situated.

To prevent the heating-apparatus from igniting the wooden case, and also at the same time to bring the fresh air into close connection with it, so that the air will be sufficiently heated for the various purposes required, as it finds ingress into the case, the heating-apparatus is encased on the sides and rear end with a sheet-iron jacket, J, and surmounted by a deflecting-plate or cover, K, the latter being set above the jacket sufficiently to allow the heated air to escape from the heating-chamber into the drying-chamber, and in order to retain the air in contact with the heating-device to some extent, the upper edge of the sheet-iron jacket J is bent inward, to direct the air in contact with the heating-device, and the outer edges of the cover or deflecting-plate K, are bent downward to prevent its too rapid escape.

The deflecting-plate has an opening, furnished with a shutter at N, over the top of the stove, to afford access thereto for heating sad-irons.

The object of making the return-chamber a part of the stove, and separating it from the fire-chamber by a thin partition, is, that the escaping products of combustion may receive additional heat at this point, thereby insuring a better draught and circulation through the horizontal pipes D.

This arrangement of the heating-apparatus is also economical of fuel, as it affords a large amount of heating-surface.

In order to retain the heated air in the drying-chamber until it has absorbed from the fruit or other articles placed therein, all the moisture that it is susceptible of, I have provided for downward ventilation of the chamber by making the ends and top of the case double, thus forming an air-space or duct into which the air escapes from the chamber through openings at the bottom of the inside lining B, and in order to insure this ventilation of the case, I connect the air-space thus formed by means of a pipe, I, with an enlarged pipe, H, that surrounds the smoke-pipe G, the enlarged pipe H being closed at the bottom, and forming a chamber around the smoke-pipe that becomes heated by the escaping smoke, and thus creates an upward current of air in the space formed by lining the top and ends of the case.

Direct upward escape of the air from the case is provided for by openings in the lining B, at or near the top of the ends, that are covered by slides L, either or both of which may be opened more or less, at pleasure.

The water-heating chamber F, is similar to the water-backs frequently placed in cooking and other stoves, for heating water in a separate tank situated at any convenient place, and like them, is to be connected with the tank by means of two pipes, the upper one or flow-pipe being situated near the top, and the lower or return-pipe near the bottom of chamber F, for the purpose of heating water for washing and for other purposes.

It will be seen that the arrangement of the apparatus for heating the air as it ascends into the chamber formed by the casing J K, surrounding and covering the stove C E, and pipe D, through the perforations in the sheet-iron bottom M, combined with the water-heating chamber F, and the drying-chamber, provide in a compact and comparatively inexpensive manner, a complete device for warming the room in which it may be situated, heating water for washing and other purposes, heating sad-irons, and drying clothes, fruit, &c.

When used for warming rooms, the doors of the case are to be left open, but the room may be warmed simultaneously with drying clothes or fruit, as the heated air of the case may escape into the room by way of pipes I and H.

Having thus fully described my invention,

What I claim as new, and desire to secure by Letters Patent, is—

1. The heating-apparatus, composed of the chambers C, E, and F, and pipe D, case J K, and perforated floor M, all constructed and arranged substantially as and for the purpose set forth.

2. The drying-chamber, constructed with the double ends and top, constituting the vertiduct O, arranged for downward ventilation, when said vertiduct is connected by pipe I, with the heated chamber formed by surrounding the smoke-pipe G with a jacket, H, and combined with the heating-device specified in the first claim, all arranged and operating substantially as set forth.

O. F. MAYHEW.

Witnesses:
WM. H. WEEKS,
E. T. COX.